(12) United States Patent
Mourad et al.

(10) Patent No.: US 8,801,903 B2
(45) Date of Patent: Aug. 12, 2014

(54) INDUSTRIAL FABRIC FOR PRODUCING TISSUE AND TOWEL PRODUCTS, AND METHOD OF MAKING THEREOF

(71) Applicant: Albany International Corp., Albany, NY (US)

(72) Inventors: Sabri Mourad, Chatenois (FR); Jonas Karlsson, Halmstad (SE)

(73) Assignee: Albany International Corp., Albany, NY (US)

( * ) Notice: Subject to any disclaimer, the term of this patent is extended or adjusted under 35 U.S.C. 154(b) by 0 days.

(21) Appl. No.: 13/886,881

(22) Filed: May 3, 2013

(65) Prior Publication Data
US 2013/0264318 A1 Oct. 10, 2013

Related U.S. Application Data

(62) Division of application No. 12/695,015, filed on Jan. 27, 2010, now Pat. No. 8,454,800.

(60) Provisional application No. 61/147,894, filed on Jan. 28, 2009.

(51) Int. Cl.
*D21F 1/10* (2006.01)
*B32B 3/24* (2006.01)
*B23K 26/38* (2014.01)

(52) U.S. Cl.
USPC ........... 162/348; 162/116; 162/903; 428/132; 264/400; 264/482; 219/121.71

(58) Field of Classification Search
CPC .... B32B 3/266; D21F 1/0063; B23K 26/383; B23K 26/4055
USPC ........... 162/348, 358.2, 116, 358.4, 900–904, 162/361, 362; 428/131, 132, 137; 264/400, 264/482; 8/106; 26/7; 83/30; 219/121.7, 219/121.71
See application file for complete search history.

(56) References Cited

U.S. PATENT DOCUMENTS

| | | | |
|---|---|---|---|
| 2,862,251 A | 12/1958 | Kalwaites | |
| 3,121,660 A * | 2/1964 | Hall, Jr. | 162/348 |
| 3,214,819 A | 11/1965 | Guerin | |
| 3,323,226 A * | 6/1967 | Christie et al. | 34/95 |
| 3,399,111 A | 8/1968 | Beaumont et al. | |
| 3,485,706 A | 12/1969 | Evans | |
| 3,508,308 A | 4/1970 | Bunting, Jr. et al. | |
| 4,085,485 A | 4/1978 | Brandon et al. | |
| 4,206,258 A | 6/1980 | Balcar | |

(Continued)

FOREIGN PATENT DOCUMENTS

| | | |
|---|---|---|
| DE | 25 38 691 A | 3/1977 |
| DE | 3444082 A | 8/1986 |

(Continued)

*Primary Examiner* — Eric Hug
(74) *Attorney, Agent, or Firm* — Frommer Lawrence & Haug LLP; Ronald R. Santucci

(57) ABSTRACT

A nonwoven fabric includes a plurality of through voids, where each of the voids has a first opening associated with a top surface of the fabric and a first raised edge circumferentially adjacent to the first opening. The voids may each further include a second opening associated with a bottom surface of the fabric and a second raised edge circumferentially adjacent to the second opening, such that the first opening may have a surface area that is larger than or the same as the second opening.

4 Claims, 17 Drawing Sheets

(56) References Cited

U.S. PATENT DOCUMENTS

| | | |
|---|---|---|
| 4,446,187 A * | 5/1984 | Eklund .................. 428/136 |
| 4,495,680 A | 1/1985 | Beck |
| 4,537,658 A | 8/1985 | Albert |
| 4,541,895 A | 9/1985 | Albert |
| 4,842,905 A | 6/1989 | Stech |
| 4,849,054 A | 7/1989 | Klowak |
| 5,098,764 A | 3/1992 | Drelich et al. |
| 5,208,087 A | 5/1993 | Stigberg |
| 5,244,711 A | 9/1993 | Drelich et al. |
| 5,245,025 A | 9/1993 | Trokhan et al. |
| 5,281,461 A | 1/1994 | Greenway et al. |
| 5,298,124 A | 3/1994 | Eklund et al. |
| 5,336,373 A | 8/1994 | Scattolino et al. |
| 5,360,656 A | 11/1994 | Rexfelt et al. |
| 5,393,384 A | 2/1995 | Steiner et al. |
| 5,445,746 A | 8/1995 | Lee |
| 5,549,193 A | 8/1996 | Schlueter, Jr. et al. |
| 5,674,587 A | 10/1997 | James et al. |
| 5,679,222 A | 10/1997 | Rasch et al. |
| 2,730,246 A | 2/1998 | Vuillaume |
| 5,713,399 A | 2/1998 | Collette et al. |
| 5,730,817 A | 3/1998 | Feygin et al. |
| 2,734,285 A | 6/1998 | Noelle |
| 5,776,307 A | 7/1998 | Ampulski et al. |
| 5,814,349 A | 9/1998 | Geus et al. |
| 5,827,597 A | 10/1998 | James et al. |
| 5,837,102 A * | 11/1998 | Graf .................. 162/296 |
| 5,900,122 A | 5/1999 | Huston |
| 5,906,786 A | 5/1999 | James et al. |
| 5,916,462 A * | 6/1999 | James et al. ............ 219/121.71 |
| 5,972,813 A | 10/1999 | Polat et al. |
| 6,010,598 A | 1/2000 | Boutilier et al. |
| 6,120,642 A | 9/2000 | Lindsay et al. |
| 6,124,015 A | 9/2000 | Baker et al. |
| 6,159,880 A | 12/2000 | Schiel |
| 6,171,447 B1 | 1/2001 | Trokhan |
| 6,274,042 B1 | 8/2001 | Beck |
| 6,290,818 B1 | 9/2001 | Romanski |
| 6,331,341 B1 | 12/2001 | Joyce |
| 6,340,413 B1 | 1/2002 | Nilsson et al. |
| 6,358,594 B1 | 3/2002 | Ampulski |
| 6,436,240 B1 | 8/2002 | Jeffrey |
| 6,461,474 B1 | 10/2002 | Lindsay et al. |
| 6,547,924 B2 | 4/2003 | Klerelid et al. |
| 6,610,173 B1 | 8/2003 | Lindsay et al. |
| 6,616,812 B2 | 9/2003 | Beck |
| 6,616,814 B2 | 9/2003 | Best |
| 6,630,223 B2 | 10/2003 | Hansen |
| 6,660,362 B1 | 12/2003 | Lindsay et al. |
| 6,712,940 B2 | 3/2004 | Crook |
| 6,723,208 B1 | 4/2004 | Hansen |
| 6,743,339 B1 | 6/2004 | Nilsson et al. |
| 6,743,571 B1 | 6/2004 | Hill et al. |
| 6,780,282 B2 | 8/2004 | Scherb et al. |
| 6,865,784 B2 | 3/2005 | Nolle |
| 6,875,315 B2 | 4/2005 | Bakken et al. |
| 6,878,238 B2 | 4/2005 | Bakken et al. |
| 6,989,080 B2 | 1/2006 | Hansen |
| 6,998,017 B2 | 2/2006 | Lindsay et al. |
| 7,005,044 B2 | 2/2006 | Kramer et al. |
| 7,008,513 B2 | 3/2006 | Davenport et al. |
| 7,014,735 B2 | 3/2006 | Kramer et al. |
| 7,022,208 B2 | 4/2006 | Davenport et al. |
| 7,128,809 B2 | 10/2006 | Viinson et al. |
| 7,128,810 B2 | 10/2006 | Hansen |
| 7,141,142 B2 | 11/2006 | Burazin et al. |
| 7,144,479 B2 | 12/2006 | Davis et al. |
| 7,166,196 B1 | 1/2007 | Kramer et al. |
| 7,169,265 B1 | 1/2007 | Kramer et al. |
| 7,294,238 B2 | 11/2007 | Bakken et al. |
| 7,297,233 B2 | 11/2007 | Herman et al. |
| 7,410,554 B2 | 8/2008 | Davenport |
| 7,491,297 B2 | 2/2009 | Serr et al. |
| 7,494,571 B2 | 2/2009 | Takamura |
| 7,501,044 B2 | 3/2009 | Hikida et al. |
| 7,504,060 B2 | 3/2009 | Brock et al. |
| 7,524,403 B2 | 4/2009 | Fernandes et al. |
| 7,527,709 B2 | 5/2009 | Fernandes et al. |
| 7,540,942 B2 | 6/2009 | Hikita |
| 7,550,061 B2 | 6/2009 | Walkenhaus et al. |
| 2003/0087575 A1 | 5/2003 | Carlson et al. |
| 2003/0145444 A1 | 8/2003 | Schmitz |
| 2004/0069432 A1 | 4/2004 | Hansen |
| 2004/0116031 A1 | 6/2004 | Brennan et al. |
| 2004/0118545 A1 | 6/2004 | Bakken et al. |
| 2004/0118546 A1 | 6/2004 | Bakken et al. |
| 2005/0167062 A1 | 8/2005 | Herman et al. |
| 2007/0028997 A1* | 2/2007 | Best et al. .................. 139/383 R |
| 2007/0134467 A1* | 6/2007 | Sayers ................. 428/121 |
| 2007/0167099 A1 | 7/2007 | Patel et al. |
| 2007/0246119 A1 | 10/2007 | Herman |
| 2007/0298213 A1 | 12/2007 | Noda et al. |

FOREIGN PATENT DOCUMENTS

| | | |
|---|---|---|
| DE | 19548747 A | 7/1997 |
| EP | 0 037 387 | 10/1981 |
| EP | 0 147 904 | 7/1985 |
| EP | 0 337 451 | 10/1989 |
| EP | 0 446 432 A1 | 9/1991 |
| EP | 0 705 933 A | 4/1996 |
| EP | 0 972 876 A2 | 1/2000 |
| EP | 1040223 B | 2/2003 |
| EP | 1339915 B | 7/2007 |
| FR | 1460513 | 10/1966 |
| FR | 2730246 | 8/1996 |
| FR | 2734285 | 11/1996 |
| GB | 995620 | 6/1965 |
| GB | 1025000 | 4/1966 |
| GB | 1037003 | 7/1966 |
| GB | 1 393 426 | 5/1975 |
| GB | 1 515 455 | 6/1978 |
| JP | 61-020686 | 1/1986 |
| JP | 06-170959 | 6/1994 |
| JP | 2001-288671 A | 10/2001 |
| WO | WO 86/05219 A | 9/1986 |
| WO | WO 95/21285 A | 8/1995 |
| WO | WO 98/00605 A | 1/1998 |
| WO | WO 98/01618 A | 1/1998 |
| WO | WO 99/10597 A | 3/1999 |
| WO | WO 02/40769 A | 5/2002 |
| WO | WO 02/41815 A | 5/2002 |
| WO | WO 2004/038093 A | 5/2004 |
| WO | WO 2005/042836 A | 5/2005 |
| WO | WO 2005/087997 A | 9/2005 |
| WO | WO 2005/116332 A | 12/2005 |
| WO | WO 2008/006870 A | 1/2008 |
| WO | WO 2010/030298 A | 3/2010 |
| WO | WO-2010/030570 A | 3/2010 |
| WO | WO-2010/068765 | 6/2010 |

\* cited by examiner

INDUSTRIAL FABRIC FOR PRODUCING TISSUE AND TOWEL PRODUCTS, AND METHOD OF MAKING THEREOF

CROSS-REFERENCE TO RELATED APPLICATIONS

This application is a division of U.S. patent application Ser. No. 12/695,015 filed Jan. 27, 2010 entitled "Industrial Fabric for Producing Tissue and Towel Products, and Method of Making Thereof" which claims priority benefit of U.S. Provisional Patent Application No. 61/147,894, filed Jan. 28, 2009, the disclosures of both are incorporated herein by reference.

INCORPORATION BY REFERENCE

All patents, patent applications, documents, references, manufacturer's instructions, descriptions, product specifications, and product sheets for any products mentioned herein are incorporated by reference herein, and may be employed in the practice of the invention.

BACKGROUND OF THE INVENTION

1. Field of the Invention

The instant invention is directed to endless fabrics, and particularly, industrial fabrics used as fabrics in the production of paper products. More particularly, the instant invention is directed to nonwoven fabrics used in the production of products such as paper, sanitary tissue and towel products.

2. Description of the Prior Art

Soft, absorbent disposable paper products, such as facial tissue, bath tissue and paper toweling, are a pervasive feature of contemporary life in modern industrialized societies. While there are numerous methods for manufacturing such products, in general terms, their manufacture begins with the formation of a cellulosic fibrous web in the forming section of a papermaking machine. The cellulosic fibrous web is formed by depositing a fibrous slurry, that is, an aqueous dispersion of cellulosic fibers, onto a moving forming fabric in the forming section of a papermaking machine. A large amount of water is drained from the slurry through the forming fabric, leaving the cellulosic fibrous web on the surface of the forming fabric.

Further processing and drying of the cellulosic fibrous web generally proceeds using one of two well-known methods. These methods are commonly referred to as wet-pressing and drying. In wet pressing, the newly formed cellulosic fibrous web is transferred to a press fabric and proceeds from the forming section to a press section that includes at least one press nip. The cellulosic fibrous web passes through the press nip(s) supported by the press fabric, or, as is often the case, between two such press fabrics. In the press nip(s), the cellulosic fibrous web is subjected to compressive forces which squeeze water therefrom. The water is accepted by the press fabric or fabrics and, ideally, does not return to the fibrous web or paper.

After pressing, the paper is transferred, by way of, for example, a press fabric, to a rotating Yankee dryer cylinder that is heated, thereby causing the paper to substantially dry on the cylinder surface. The moisture within the web as it is laid on the Yankee dryer cylinder surface causes the web to adhere to the surface, and, in the production of tissue and toweling type paper products, the web is typically creped from the dryer surface with a creping blade. The creped web can be further processed by, for example, passing through a calender and wound up prior to further converting operations.

The action of the creping blade on the paper is known to cause a portion of the interfiber bonds within the paper to be broken up by the mechanical smashing action of the blade against the web as it is being driven into the blade. However, fairly strong interfiber bonds are formed between the cellulosic fibers during the drying of the moisture from the web. The strength of these bonds is such that, even after conventional creping, the web retains a perceived feeling of hardness, a fairly high density, and low bulk and water absorbency.

In order to reduce the strength of the interfiber bonds that are formed by the wet-pressing method, Through Air Drying ("TAD") can be used. In the TAD process, the newly formed cellulosic fibrous web is transferred to a TAD fabric by means of an air flow, brought about by vacuum or suction, which deflects the web and forces it to conform, at least in part, to the topography of the TAD fabric. Downstream from the transfer point, the web, carried on the TAD fabric, passes through and around the through-air-dryer, where a flow of heated air, directed against the web and through the TAD fabric, dries the web to a desired degree. Finally, downstream from the through-air-dryer, the web may be transferred to the surface of a Yankee dryer for further and complete drying. The fully dried web is then removed from the surface of the Yankee dryer with a doctor blade, which foreshortens or crepes the web thereby further increasing its bulk. The foreshortened web is then wound onto rolls for subsequent processing, including packaging into a form suitable for shipment to and purchase by consumers.

In the TAD process, the lack of web compaction, such as would occur in the wet-pressing process when the web is pressed in a nip while on the fabric and against the Yankee drying cylinder when it is transferred thereto, reduces the opportunity for strong interfiber bonds to form, and results in the finished tissue or towel product to have greater bulk than can be achieved by conventional wet-pressing. Generally, however, the tensile strength of webs formed in the through-air drying process is not adequate for a finished consumer product, and various types of chemical additives are typically introduced into the web prior to and/or during the forming operation to achieve the desired strength while still retaining most of the bulk of the original product.

As noted above, there are many methods for manufacturing bulk tissue products, and the foregoing description should be understood to be an outline of the general steps shared by some of the methods. For example, the use of a Yankee dryer is not always required, as, in a given situation, foreshortening may not be desired, or other means, such as "wet creping", may have already been taken to foreshorten the web.

Other process and machine configuration variations of either wet pressing or through-air-drying are also to be considered here. For example, in some cases, no creping doctor is employed when the sheet is removed from the dryer surface. Further, there are processes that are alternatives to the through-air-drying process that attempt to achieve "TAD-like" tissue or towel product properties without the TAD units and high energy costs associated with the TAD process.

The properties of bulk, absorbency, strength, softness, and aesthetic appearance are important for many products when used for their intended purpose, particularly when the fibrous cellulosic products are facial or toilet tissue or paper towels. To produce a paper product having these characteristics, a fabric will often be constructed such that the sheet contact surface exhibits topographical variations. These topographical variations are often measured as plane differences between woven yarn strands in the surface of the fabric. For example, a plane difference is typically measured as the difference in height between a raised weft or warp yarn strand or as the difference in height between machine-direction (MD) knuckles and cross-machine direction (CD) knuckles in the plane of the fabric's surface. Often, the fabric structure will exhibit pockets in which case plane differences may be measured as a pocket depth.

It should be appreciated that these fabrics may take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it is dried.

The instant invention provides a nonwoven fabric that functions in place of a traditional woven fabric, and imparts desired texture, hand, and bulk to the tissue and towel products produced thereon.

SUMMARY OF THE INVENTION

It is therefore a principal object of the invention to provide a nonwoven papermaker's fabric that imparts desired texture, hand, and bulk to the tissue and towel products produced thereon.

Yet another object of the invention is to provide a nonwoven papermaker's fabric that has a topography of through voids.

A further object of the invention is to provide a nonwoven papermaker's fabric that not only provides for an improved paper product being produced thereon but may also allow for the process to be run at a wide array of percentages of fabric crepe and basis weight. Thus, the range of operating process parameters and/or the amount of recycled fiber content may be increased.

These and other objects and advantages are provided by the instant invention. In contrast to a paper web produced on a prior art woven fabric, according to one aspect of the instant invention, a nonwoven fabric or belt with a topography of through voids is provided, whereby the fabric or belt results in a paper web (tissue or towel) that has high caliper and low density upon application of a vacuum.

Other advantages such as, but not limited to, the provision of no air leakage leading to more effective wet shaping; an improved sheet pickup and release over prior art woven fabrics; little to no rewet; and easier cleanability as a result of no yarn crossovers to trap paper fibers were also discovered.

Fabrics of the instant invention can find application in papermaking machines as impression fabrics, creping fabrics or other applications which will be apparent to one skilled in the art.

For a better understanding of the invention, its operating advantages and specific objects attained by its uses, reference is made to the accompanying descriptive matter in which preferred embodiments of the invention are illustrated in the accompanying drawings in which corresponding components are identified by the same reference numerals.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PREFERRED EMBODIMENTS

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

Figure 4:
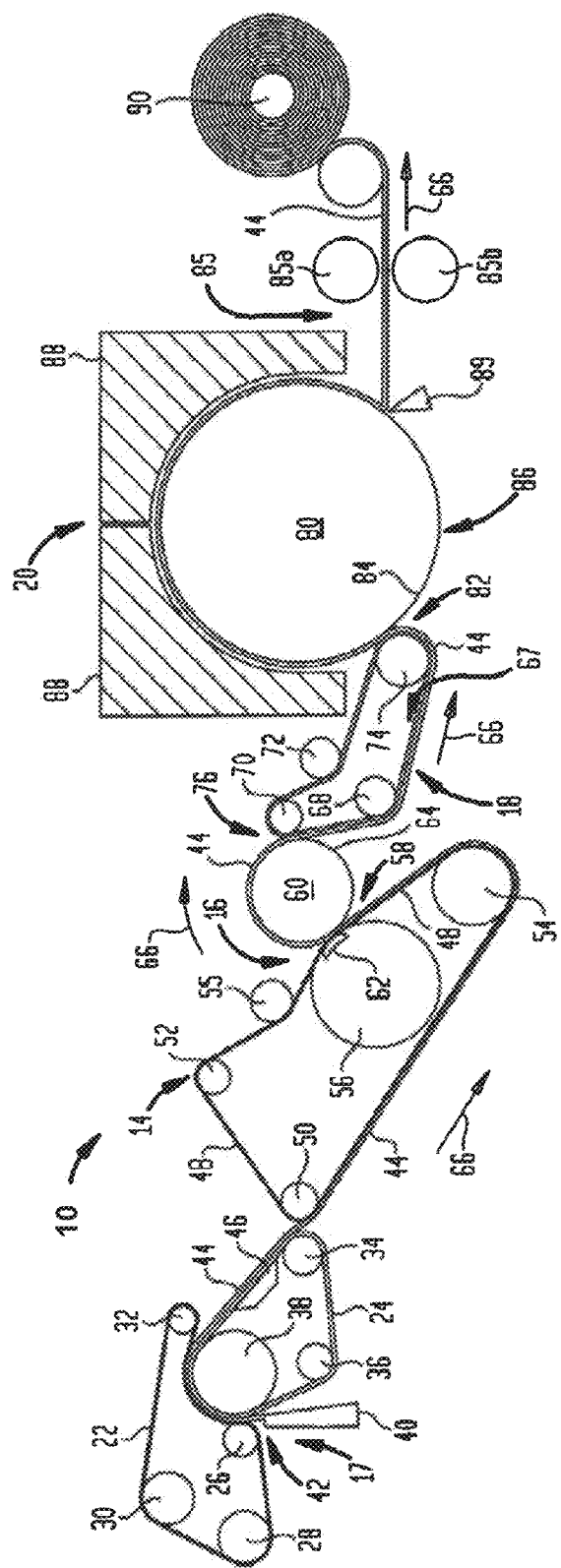
FIG. 4 is a schematic diagram of a papermaking machine used in a papermaking process.

The present invention provides a nonwoven fabric for use in the apparatus shown in FIG. 4, for example. The nonwoven fabric functions in place of a traditional woven fabric, and imparts desired texture, hand, and bulk to the tissue and towel products produced thereon. The fabric of the present invention may reduce the manufacturing time and costs associated with the production of paper products. Production time and costs may be reduced because fabrics of the instant invention may also reduce and even prevent water removed from a paper web from rewetting the web when used as a conventional TAD fabric. Therefore, the paper web will be dried quickly and more efficiently. As depicted in FIG. 4, an embodiment of the manufacturing process and a papermaking machine 10 used in the process are described as follows.

The papermaking machine 10 has a conventional twin wire forming section 12, a fabric run 14, a shoe press section 16, a creping fabric 18 and a Yankee dryer 20. Forming section 12 includes a pair of forming fabrics 22, 24 supported by a plurality of rolls 26, 28, 30, 32, 34, 36 and a forming roll 38. A headbox 40 provides papermaking furnish to a nip 42 between forming roll 38 and roll 26 and the fabrics. The furnish forms a web 44 which is dewatered on the fabrics with the assistance of a vacuum, for example, by way of vacuum box 46.

The web 44 is advanced to a papermaking press fabric 48, which is supported by a plurality of rolls 50, 52, 54, 55, the fabric being in contact with a shoe press roll 56. The web 44 is of a low consistency as it is transferred to the fabric 48. Transfer may be assisted by vacuum, for example, roll 50 may be a vacuum roll if so desired or a pickup or vacuum shoe as is known in the art. As the web reaches the shoe press roll 56, it may have a consistency of 10 to 25 percent, preferably 20 to 25 percent or so as it enters nip 58 between shoe press roll 56 and transfer roll 60. Transfer roll 60 may be a heated roll if so desired. Instead of a shoe press roll, roll 56 could be a conventional suction pressure roll. If a shoe press is employed it is desirable and preferred that roll 54 is a vacuum roll to more effectively remove water form the fabric prior to the fabric entering the shoe press nip since water from the furnish will be pressed into the fabric in the shoe press nip. In any case, using a vacuum roll 54 is typically desirable to ensure the web remains in contact with the fabric during the direction change as one of skill in the art will appreciate from the diagram.

Web 44 is wet-pressed on the fabric 48 in nip 58 with the assistance of pressure shoe 62. The web is thus compactively dewatered at nip 58 typically by increasing the consistency by 15 or more percentage solids at this stage of the process. The configuration shown at nip 58 is generally termed a shoe press. In connection with the present invention, cylinder 60 is operative as a transfer cylinder which operates to convey web 44 at high speed, typically 1000 fpm to 6000 fpm to the creping fabric 18.

Cylinder 60 has a smooth surface 64 which may be provided with an adhesive and/or release agents if needed. Web 44 is adhered to transfer surface 64 of cylinder 60 which is rotating at a high angular velocity as the web 44 continues to advance in the machine-direction indicated by arrows 66. On the cylinder 60, web 44 has a generally random apparent distribution of fiber. Direction 66 is referred to as the machine-direction (MD) of the web as well as that of papermaking machine 10, whereas the cross-machine-direction (CD) is the direction in the plane of the web perpendicular to the MD.

Web 44 enters nip 58 typically at consistencies of 10 to 25 percent or so and is dewatered and dried to consistencies of from about 25 to about 70 percent by the time it is transferred to creping fabric 18 as shown in the diagram.

Creping fabric 18 is supported on a plurality of rolls 68, 70, 72 and a press nip roll 74 and forms a fabric crepe nip 76 with transfer cylinder 60 as shown. The creping fabric 18 defines a creping nip over the distance in which creping fabric 18 is adapted to contact roll 60, that is, applies significant pressure to the web 44 against the transfer cylinder 60. To this end, backing (or creping) roll 70 may be provided with a soft deformable surface which will increase the length of the creping nip and increase the fabric creping angle between the fabric and the sheet and the point of contact. Alternatively, a shoe press roll could be used as roll 70 to increase effective contact with the web in high impact fabric creping nip 76 where web 44 is transferred to creping fabric 18 and advanced in the machine-direction. By using different equipment at the creping nip 76, it is possible to adjust the fabric creping angle or the takeaway angle from the creping nip. Thus, it is possible to influence the nature and amount of redistribution of fiber, delamination/debonding which may occur at fabric creping nip 76 by adjusting these nip parameters.

After creping, the web 44 continues to advance along machine direction 66 where it is pressed onto Yankee cylinder 80 at transfer nip 82. Transfer at nip 82 occurs at a web consistency of generally from about 25 to about 70 percent. At these consistencies, it is difficult to adhere the web 44 to surface 84 of Yankee cylinder 80 firmly enough to thoroughly remove the web 44 from the fabric. This aspect of the process is important, particularly when it is desired to use a high velocity drying hood as well as maintain high impact creping conditions. In this connection, it is noted that conventional through-air-drying (TAD) processes do not employ high velocity hoods since sufficient adhesion to the Yankee cylinder 80 is not achieved. In accordance with the process, the use of particular adhesives cooperates with a moderately moist web (25 to 70 percent consistency) to adhere it to the Yankee cylinder 80 sufficiently to allow for high velocity operation of the system and high jet velocity impingement air drying.

The web 44 is dried on Yankee cylinder 80 which is a heated cylinder and by high jet velocity impingement air in Yankee hood 88. As the cylinder 80 rotates, web 44 is creped from the cylinder by creping doctor 89 and wound on a take-up roll 90.

The instant invention relates to papermaker's fabrics used in the production of soft, absorbent, disposable paper products, such as facial tissue, bath tissue and paper toweling, or other paper products as described above. The instant fabrics, besides providing some degree of sheet topography, may minimize or even prevent rewetting of a paper product or sheet/web when used as a conventional TAD fabric. The instant fabrics may have a topography of through voids. The through voids include, among other things, geometrical characteristics that provide enhanced sheet topography and bulk to the paper products or sheets/web when produced, for example, on fabric 18. Another advantage of the instant fabrics is easier sheet release from fabric 18 to the Yankee cylinder 80. Yet another advantage is that it avoids the constraints of and need for a conventional weaving loom since the through voids can be placed in any desired location pattern and thus the aesthetics of the paper product or sheet/web appearance may be improved.

In addition, fabrics constructed in accordance with the instant invention will result in deeper pockets resulting in a paper web with higher bulk absorbency and lower density. It will be appreciated that the term "through void" is synonymous to the term "through hole" and represents any opening that passes entirely through a fabric such as a papermaker's fabric. It will also be appreciated that the fabric of the instant invention may also be used as fabric 22, 24 or 48 as well.

Figure 1A:
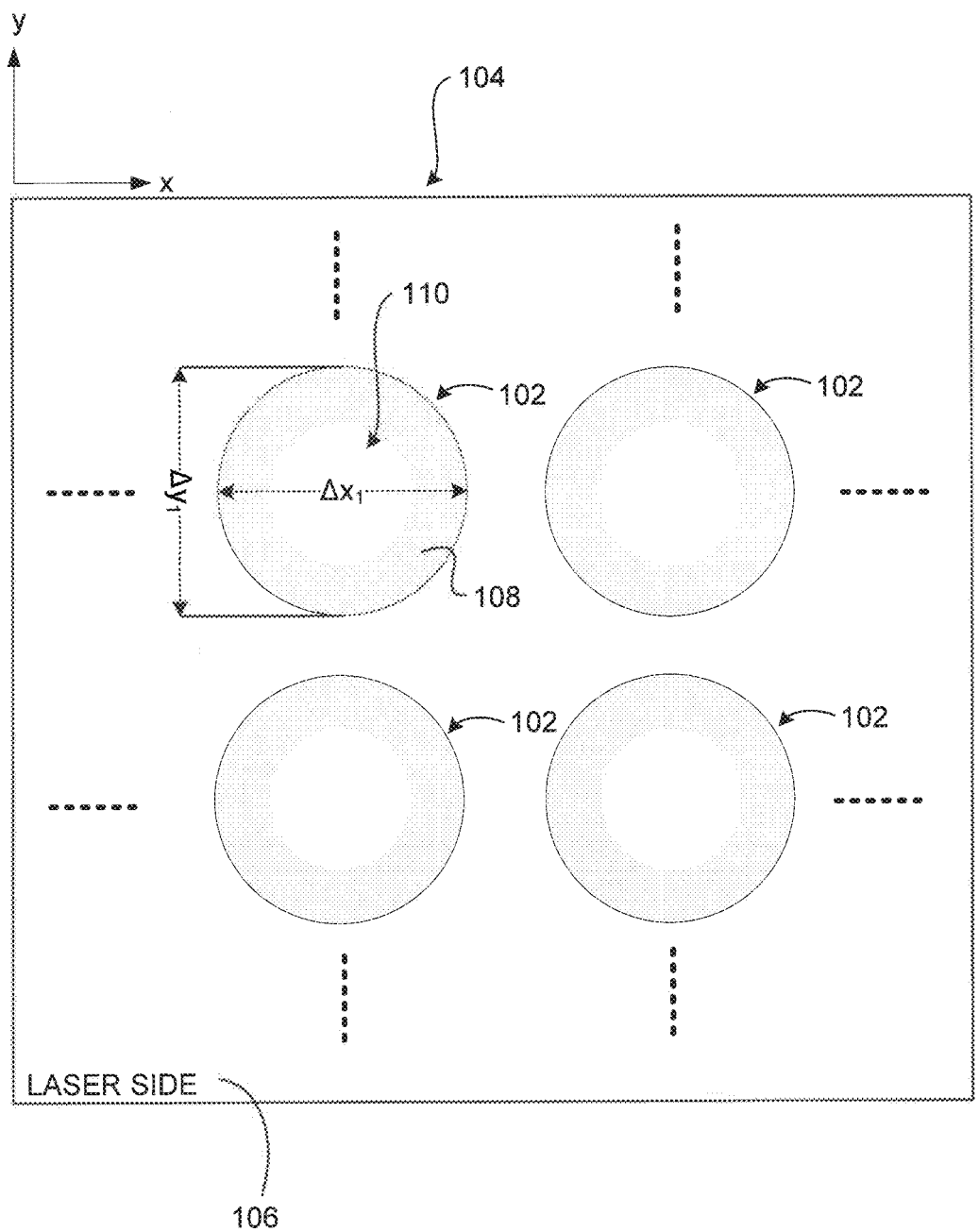
FIGS. 1A and 1B are an example of a fabric having through voids according to one aspect of the instant invention.
Figure 1B:
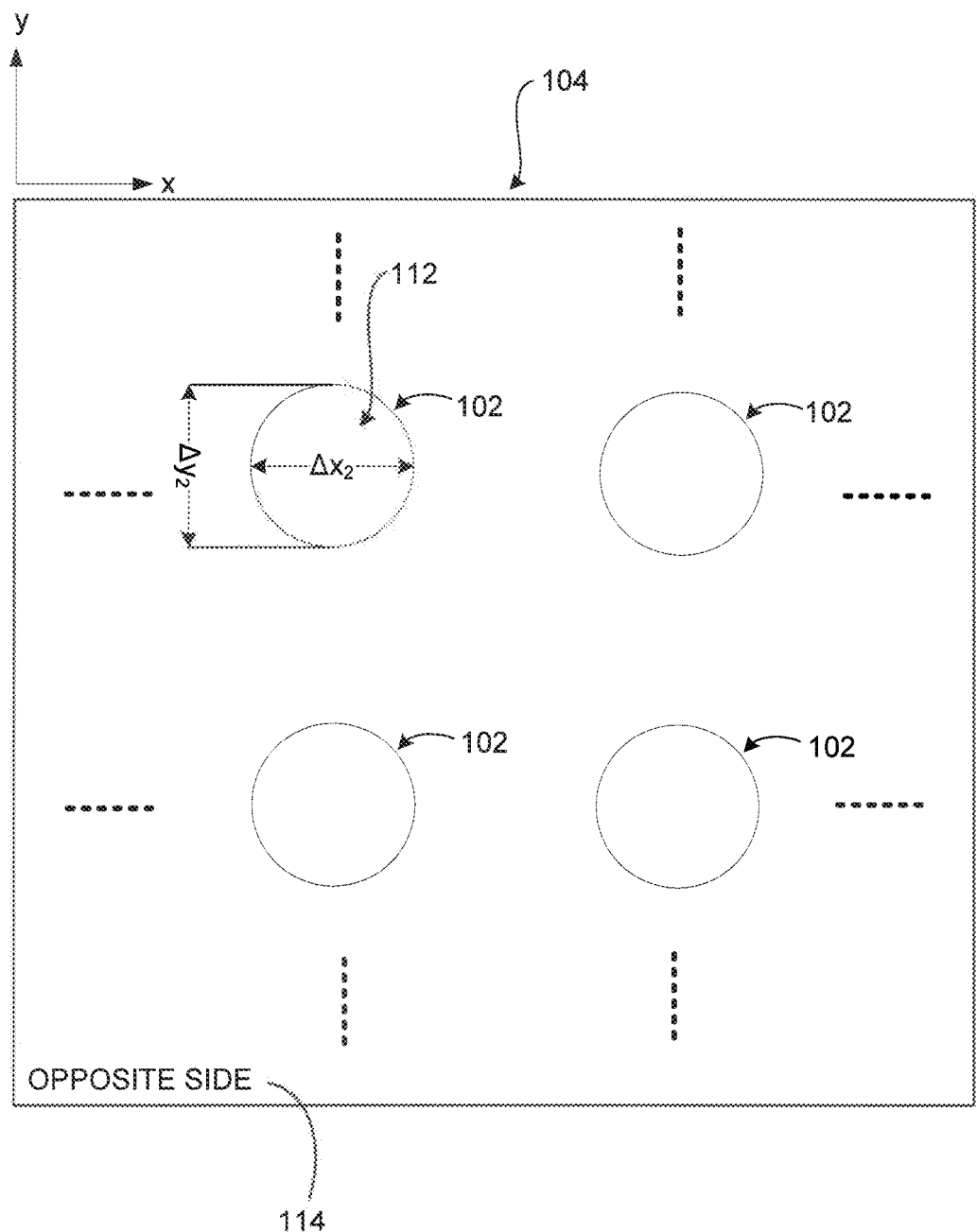

FIGS. 1A and 1B illustrate a plan view of a plurality of through voids 102 that are produced in a portion of a fabric 104 in accordance with one exemplary embodiment. According to one aspect, the through voids serve as drainage holes that are used in the production of paper products or sheets.

FIG. 1A shows the plurality of through voids 102 from the perspective of a top surface 106 (i.e., laser side) that faces a laser source (not shown), whereby the laser source is operable to create the through voids or through holes in the fabric 104. Each through void 102 may have a conical shape, where the inner surface 108 of each through void 102 tapers inwardly from the opening 110 on the top surface 106 through to the opening 112 (FIG. 1B) on the bottom surface 114 (FIG. 1B) of the fabric 104. The diameter along the x-coordinate direction for opening 110 is depicted as $\Delta x_1$ while the diameter along the y-coordinate direction for opening 110 is depicted as $\Delta y_1$. Referring to FIG. 1B, similarly, the diameter along the x=coordinate direction for opening 112 is depicted as $\Delta x_2$ while the diameter along the y-coordinate direction for opening 112 is depicted as $\Delta y_2$. As is apparent from FIGS. 1A and 1B, the diameter $\Delta x_t$ along the x-direction for the opening 110 on the top side 106 of fabric 104 is larger than the diameter $\Delta x_2$ along the x-direction for the opening 112 on the bottom side 114 of fabric 104. Also, the diameter $\Delta y_1$ along the y-direction for the opening 110 on the top side 106 of fabric 104 is larger than the diameter $\Delta y_2$ along the y-direction for the opening 112 on the bottom side 114 of fabric 104.

Figure 2A:
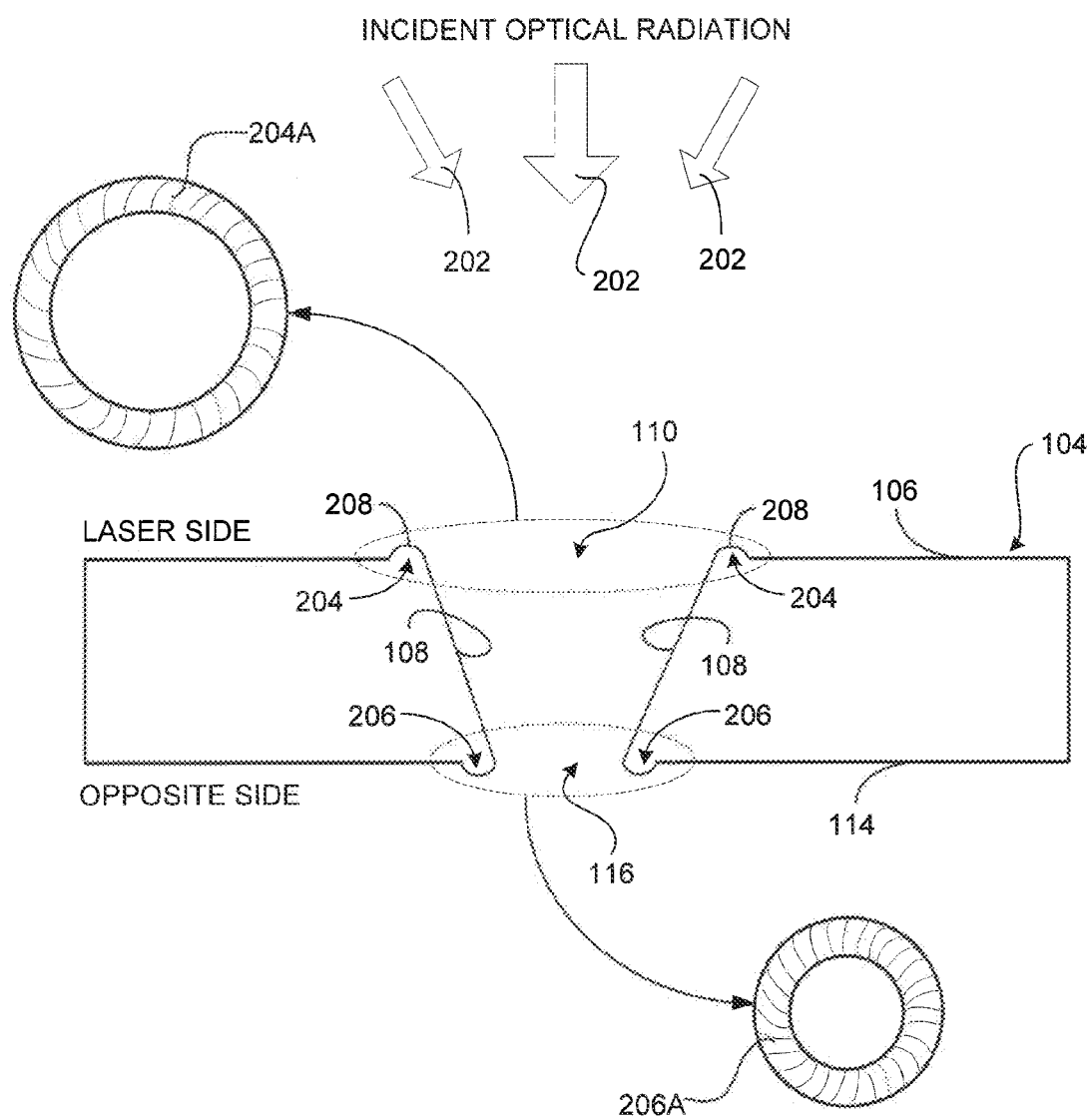
FIG. 2A is an example of a cross-section of a fabric having through voids according to one aspect of the instant invention.

FIG. 2A illustrates a cross-sectional view of one of the through voids 102 depicted in FIGS. 1A and 1B. As previously described, each through void 102 may have a conical shape, where the inner surface 108 of each through void 102 tapers inwardly from the opening 110 on the top surface 106 through to the opening 112 on the bottom surface 114 of the fabric 104. The conical shape of each through void 102 may be created as a result of incident optical radiation 202 generated from an optical source such as a $CO_2$ or other laser device. By applying laser radiation 202 of appropriate characteristics (e.g., output power, focal length, pulse width, etc.) to, for example, a nonwoven fabric, a through void 102 may be created as a result of the laser radiation perforating the surfaces 106, 114 of the fabric 104. The creation of through voids using laser devices shall be described in later paragraphs with the aid of experimental data.

As illustrated in FIG. 2A, according to one aspect, the laser radiation 202 creates, upon impact, a first raised edge or ridge 204 on the top surface 106 and a second raised edge or ridge 206 on the bottom surface 114 of the fabric 104. These raised edges 204, 206 may also be referred to as a raised rim or lip. A plan view from the top for raised edge 204 is depicted by 204A. Similarly, a plan view from the bottom for raised edge 206 is depicted by 206A. In both depicted views 204A and 206A, dotted lines 205A and 205B are graphical representations illustrative of a raised rim or lip. Accordingly, dotted lines 205A and 205B are not intended to represent striations. The height of each raised edge 204, 206 may be in the range of 5-10 μm. The height is calculated as the level difference between surface of the fabric and the top portion of the raised edge. For example, the height of raised edge 204 is measured as the level difference between surface 106 and top portion 208 of raised edge 204. Raised edges such as 204 and 206 provide, among other advantages, local mechanical reinforcement for each through void or through hole, which in turn contributes to the global resistance of a given perforated fabric (e.g., a creping fabric). Also, deeper voids result in deeper pockets in the paper produced, and also result in, for example, more bulk and lower density. It is to be noted that $\Delta x_1/\Delta x_2$ may be 1.1 or higher and $\Delta y_1/\Delta y_2$ may be 1.1 or higher in all cases. Alternatively, in some or all cases, $\Delta x_1/\Delta x_2$ may be equal to 1 and $\Delta y_1/\Delta y_2$ may be, equal to 1, thereby forming through voids of a cylindrical shape.

While the creation of through voids having raised edges in a fabric may be accomplished using a laser device, it is envisaged that other devices capable of creating such effects may also be employed. Mechanical punching or embossing then punching may be used. For example, the nonwoven fabric may be embossed with a pattern of protrusions and corresponding depressions in the surface in the required pattern. Then each protrusion for example may be mechanically punched or laser drilled.

Figure 3A:
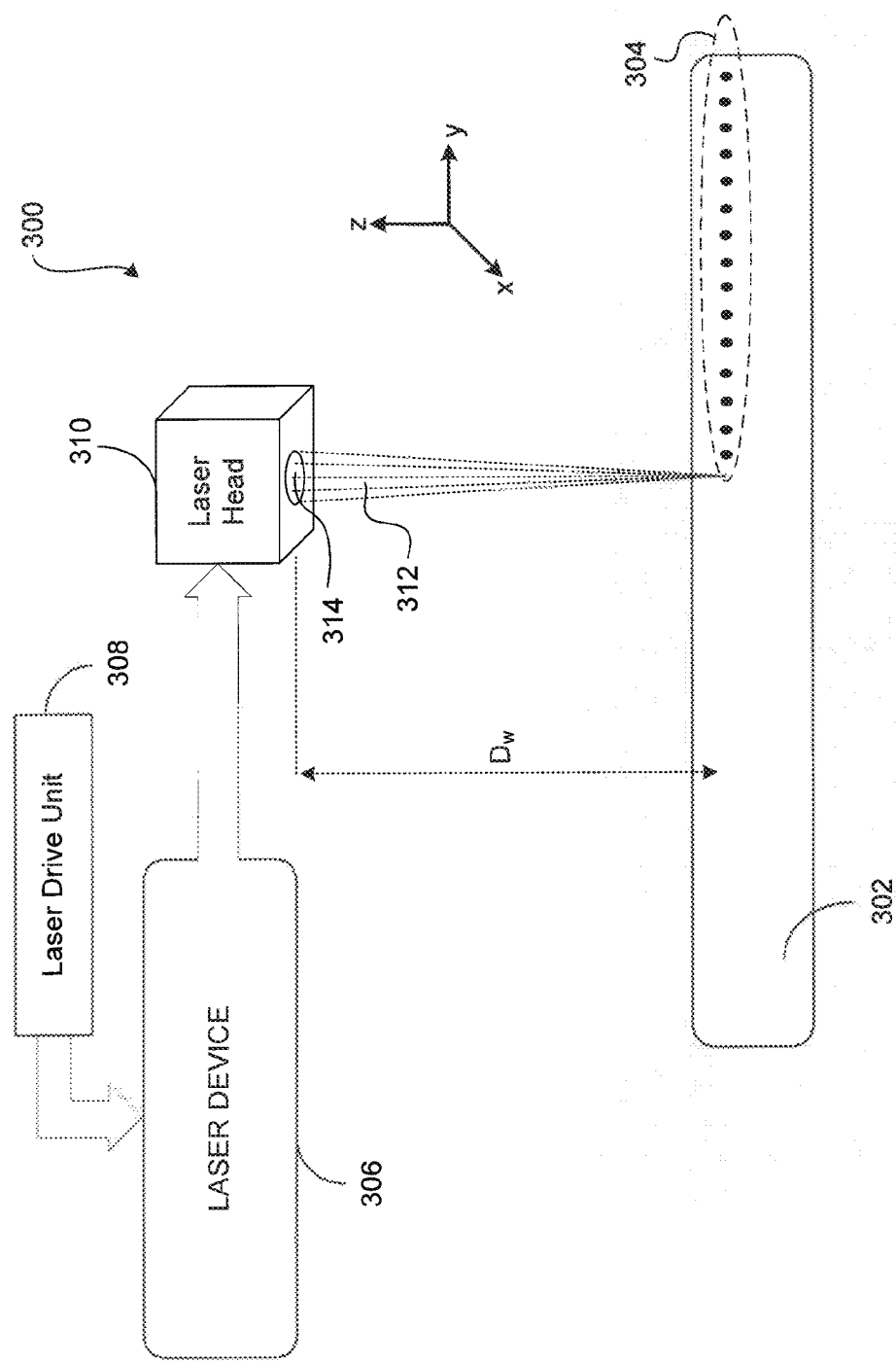
FIG. 3A is a system block diagram for generating a fabric having through voids according to one aspect of the instant invention.

FIG. 3A illustrates an exemplary embodiment of a system 300 for generating through voids 304 in a fabric 302. System 300 may include a laser device 306, a laser drive unit 308, a laser head 310, and mechanical fixtures 316 upon which the fabric 302 is placed.

The laser drive unit 308 controls the various conditions that vary the output generated by the laser. For example, the drive unit 308 may allow for the adjustment of output power from the laser and the provision of various modulation characteristics. For instance, the laser may be pulsed over a fixed or continuous time period, whereby the pulse width may be adjusted over a particular range.

The laser head 310 delivers incident optical radiation 312 to the fabric 302 via nozzle 314 for creating the through voids 304. The incident optical radiation 312 may be subjected to various beam shaping components prior to being output from the nozzle 314. For example, different optical lens arrangements may be used to achieve a desired working distance (i.e., $D_w$) between the nozzle 314 of the laser head 310 and the top surface of the fabric 302. Also, optical splitters, isolators, polarizers, slits, and/or other components may be used to vary different attributes associated with the incident optical radiation 312 output from the laser head 310. For example, control of spot-size and spot-shape may be one desired attribute. In effect, the incident optical radiation is drilling (or cutting) through holes or through voids in the fabric 302.

The fabric 302 may be mounted or placed on a suitable apparatus (e.g., see FIG. 3B) that has different motorized components, rails, rollers, etc., in order to facilitate the movement of the fabric 302 and/or the laser head 310 in a specific x-y coordinate direction. By controlling the movement of the fabric 302 along the x-y coordinate direction, a topography of through voids may be created on the fabric according to different desired patterns. In addition to the movement in the x-y direction, working distance $D_w$ may be varied by mounting the laser head 310 on a motorized platform that provides movement along a z-coordinate direction. It may be possible to design a system whereby the laser head moves in three-dimensions while the fabric remains fixed. Alternatively, the laser head may traverse across the fabric in a widthwise "x" or CD (cross machine direction) manner while the fabric moves in the machine direction (MD) or "y" axis. It may also be possible to setup a system where the fabric is moved in three-dimensions relative to a mechanically fixed laser head.

Figure 3B:
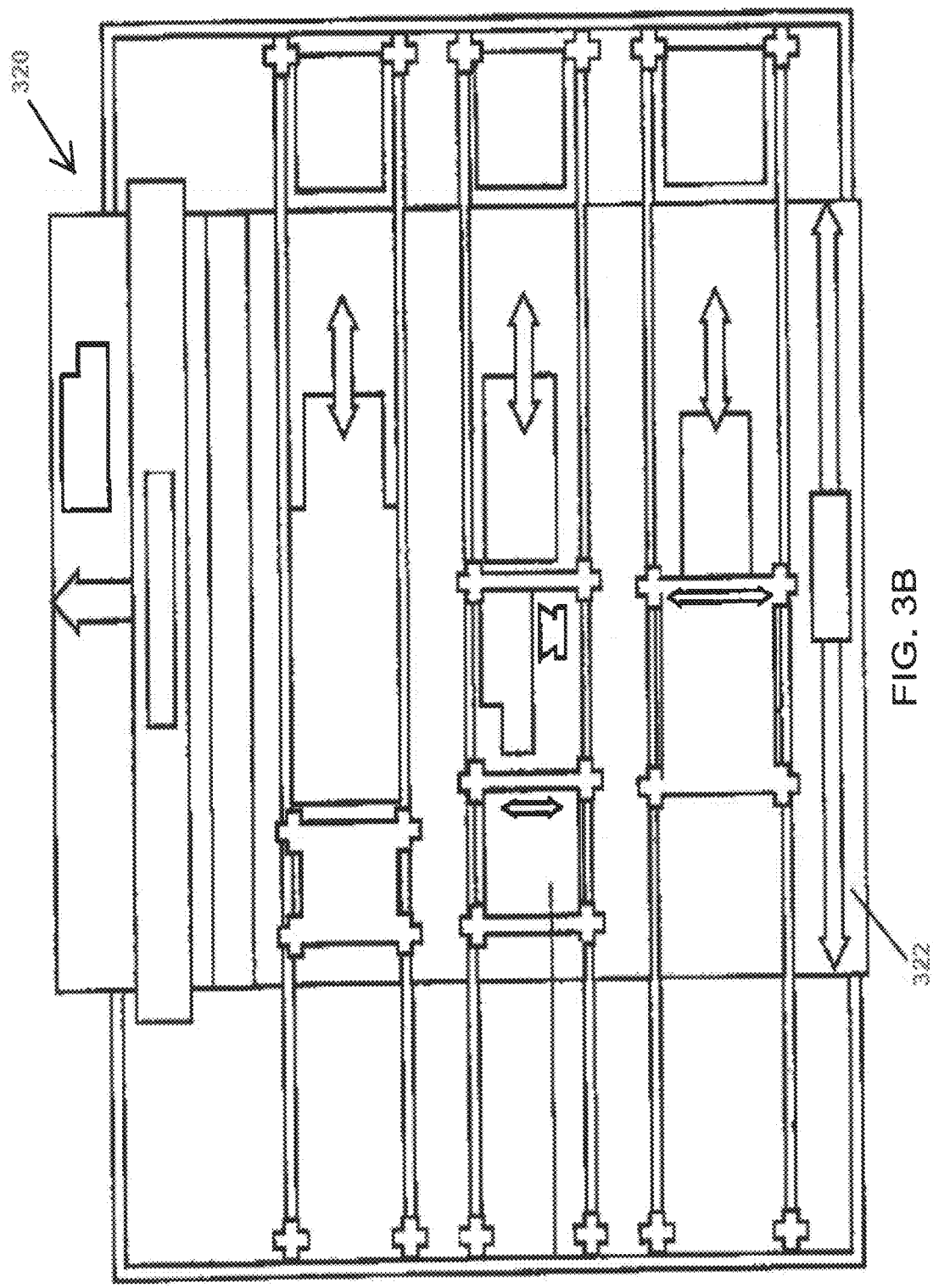
FIG. 3B illustrates an apparatus used in the generation of through voids in a fabric according to one aspect of the invention.

FIG. 3B illustrates an exemplary embodiment of an apparatus 320 used in the generation of through voids in a papermaker's fabric, according to one aspect of the invention. Fabric 322 shown in FIG. 3B should be understood to be a relatively short portion of the entire length of the fabric 322. Where the fabric 322 is endless, it would most practically be mounted about a pair of rolls, not illustrated in the figure but most familiar to those of ordinary skill in the paper machine clothing arts. In such a situation, apparatus 320 would be disposed on one of the two runs, most conveniently the top run, of the fabric 322 between the two rolls. Whether endless or not, however, fabric 322 is preferably placed under an appropriate degree of tension during the process. Moreover, to prevent sagging, fabric 322 may be supported from below by a horizontal support member as it moves through apparatus 320.

Referring now more specifically to FIG. 3B, where fabric 322 is indicated as moving in an upward direction through the apparatus 320 as the method of the present invention is being practiced, apparatus 320 comprises a sequence of several stations through which fabric 322 may pass incrementally as the papermaker's fabric is being manufactured therefrom.

The papermaker's fabric described in the above-embodiment is one example of a fabric that would be drilled according to the systems and methods described herein. The desirable characteristics of the described through voids created in the papermaker's fabric would enhance one or more characteristics associated with a paper product manufactured by a papermaking machine. Fabrics constructed according to the instant invention improve performance on the papermaking machine because the through voids in the fabric preferably are cone shaped with wide openings on the sheet side and small openings on the machine side, which in turn allows the fabric to operate at higher draw levels or at lower basis weights. Also, higher recycled fiber contents can also be used and still obtain the desired paper web property. According to the instant invention, these fabrics also provide other advantages such as, but not limited to, the provision of no air leakage leading to more effective wet shaping; an improved sheet pickup and release over prior art woven fabrics; little to no rewet; and easier cleanability as a result of no yarn crossovers to trap paper fibers.

Figure 5:
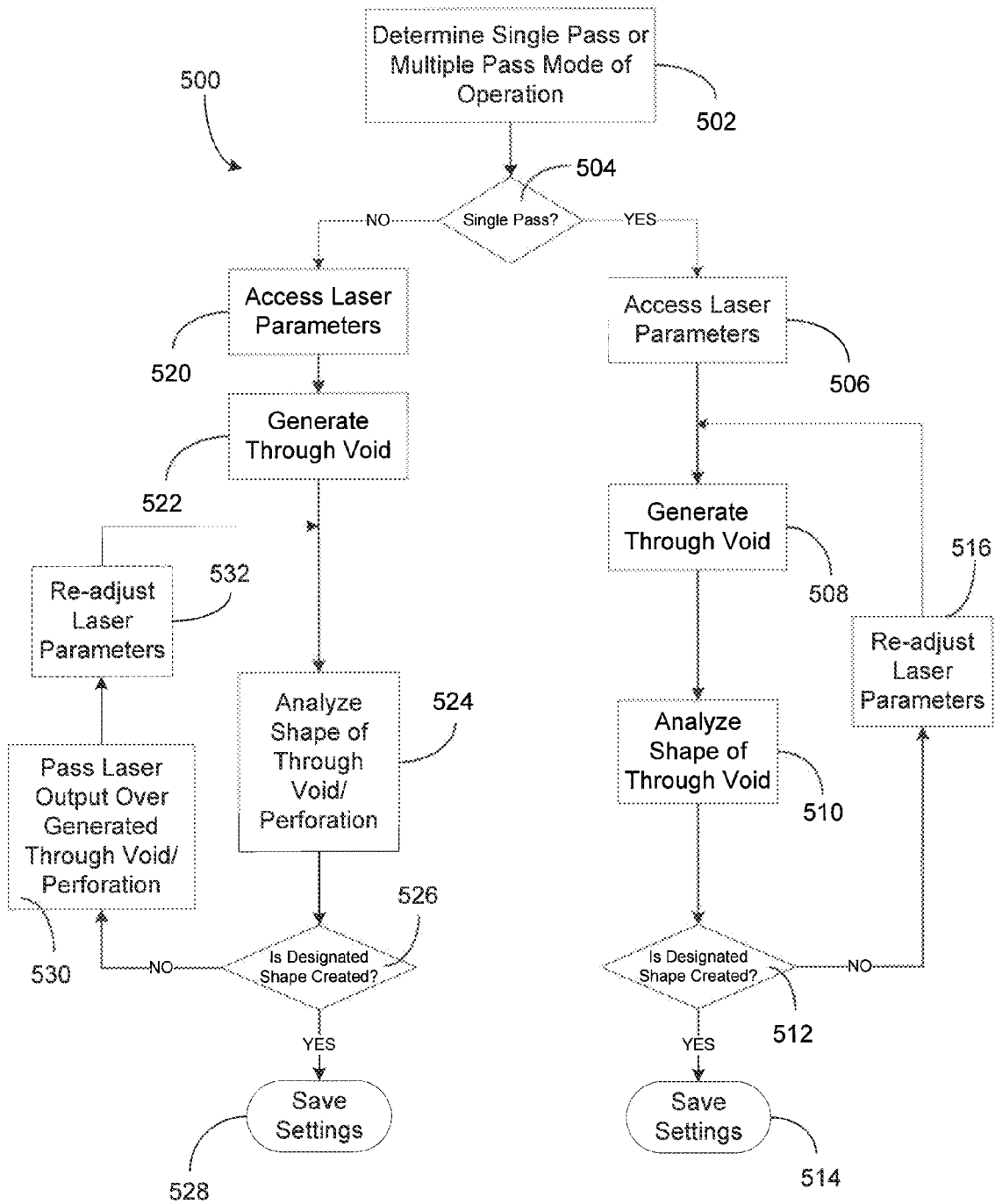
FIG. 5 is flow diagram describing the process of generating through holes in a fabric according to one aspect of the instant invention.

FIG. 5 illustrates a flow diagram 500 describing the process of generating through holes in a fabric according to one exemplary embodiment. At step 502, it is determined whether a laser device will operate in single pass mode or multi-pass mode. In single pass mode, the laser creates a through void in a single pass as it moves over the fabric. In multi-pass mode, the laser passes over the fabric for two or more times and applies optical radiation to the same locations on the fabric until creation of the desired through voids is complete.

If at step 504 it is determined that the single pass mode is selected, a set of laser parameters are accessed (step 506). These laser parameters may include the various settings that are applied to a laser drive unit such as unit 308 (FIG. 3). At step 508, based on the accessed laser parameters, optical radiation output from the laser perforates the fabric in order to generate a desired shape of the through void. At step 510, once the shape/geometry of a generated through void is analyzed (e.g., visual inspection, image acquisition/processing, etc.), it is determined whether the through void meets the desired shape criteria (step 512). If the through void meets the desired shape criteria (step 512), the accessed laser settings are saved (step 514) so that they may re-used in the process of drilling identical or similar fabrics. If on the other hand it is determined that the through void fails to meet the desired shape criteria (512), the laser parameters used to drive the laser are re-adjusted (step 516) in an attempt to produce a through void having the desired shape criteria. Process steps 512, 516, 508, and 510 continue to be executed until the shape criteria of the through holes is satisfied. Once the shape of a generated through hole meets the required shape criteria, the entire fabric may be drilled.

If at step 504 it is determined that the multi-pass mode is selected, a set of laser parameters are accessed (step 520). These laser parameters may include the various settings that are applied to a laser drive unit such as unit 308 (FIG. 3). At step 522, based on the accessed laser parameters, optical radiation output from the laser perforates the fabric in order to generate a desired shape of through void. At step 524, once the shape/geometry of a generated through void or perforation is analyzed (e.g., visual inspection, image processing, etc.), it is determined whether the perforation of the fabric has generated a through void and whether the generated through void meets the desired shape criteria (step 526). If a through void is generated and it meets the desired shape criteria (step 526), the accessed laser settings are saved (step 528) so that they may be re-used in the process of drilling identical or similar fabrics. If on the other hand it is determined that either a through void has not been generated (e.g., a perforation of fabric surface) or a generated through void fails to meet the desired shape criteria (526), the laser is passed over the through void for a subsequent time and applies optical radiation to the through hole (step 530). Process steps 526, 530, 532 (optional step), and 524 continue to be executed until both the through void is created and the required shape criteria of the through void is satisfied. Once the shape of a generated through void meets the required shape criteria, the entire fabric may be drilled. At optional step 532, the laser parameters used to drive the laser may also be re-adjusted in order to aid both the generation of the through void and/or to establish a through void having the desired shape criteria. It will be appreciated, however, that the number of passes for generating a through void vary according to many factors such as, but not limited to, the fabric material, fabric thickness, laser device type, laser operating or drive parameters, etc.

Figure 6:
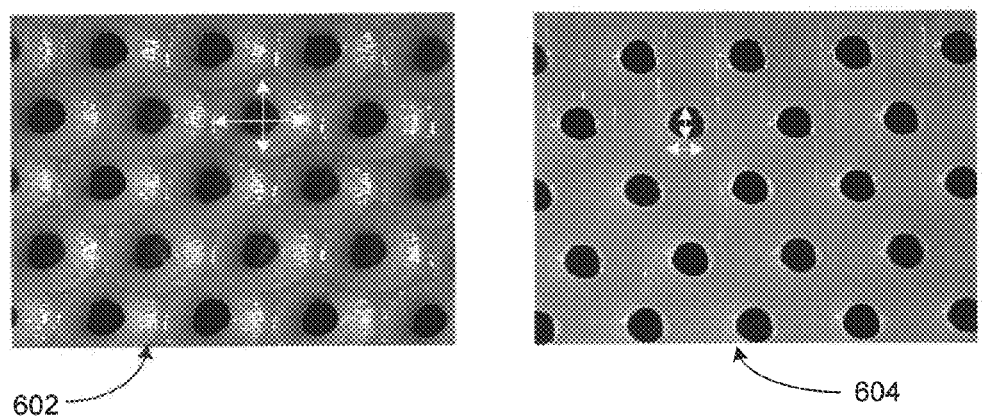
FIG. 6 illustrates images of a fabric drilled in accordance with one aspect of the instant invention.

FIG. 6 illustrates images of a fabric drilled in accordance with one or more aspects of the instant invention. Image 602 illustrates drilled through voids in a fabric, as observed from the top surface (i.e., laser side) of the fabric. Image 604 illustrates the drilled through voids, as observed from the bottom surface (i.e., opposite side) of the fabric. The drilling criteria was to achieve round shaped through voids having a higher open area on the laser side or top surface. Images 602 and 604 show the higher openings (FIG. 602) on the laser side or top surface relative to the openings on the bottom surface (FIG. 604). The through voids may be drilled using a $CO_2$ laser that may be programmed or operated to generate optical pulses of a predefined pulse width over a predefined time period. Various other parameters associated with the through void drilling process may include, for example but not limited to, setting the output power (Watts) generated by the laser, the drilling speed, the incremental movement in both x and y directions, the working distance (i.e., distance from laser head nozzle to surface of fabric), the density (holes/inch$^2$) requirements for given fabric, and the number of passes for subjecting the fabric to optical radiation.

Figure 7:
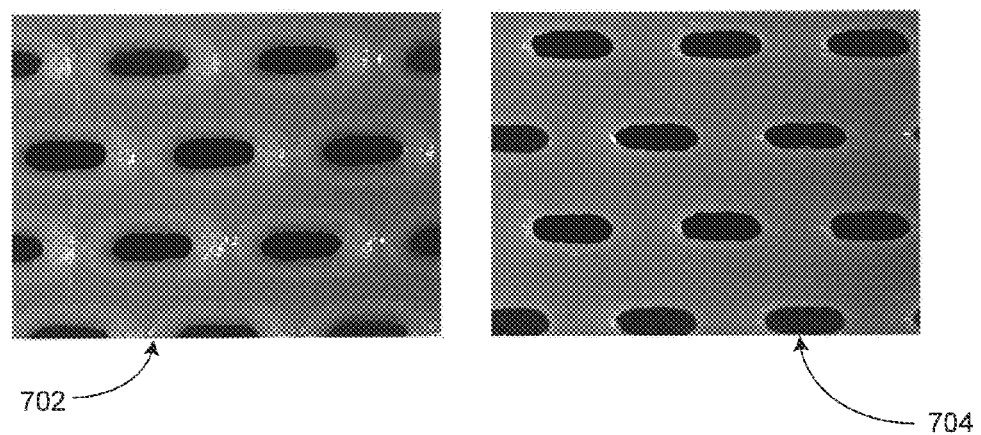
FIG. 7 illustrates images of a fabric drilled in accordance with another aspect of the instant invention.

FIG. 7 illustrates images of a fabric drilled in accordance with one or more aspects of the instant invention. Image 702 illustrates drilled through voids in a fabric, as observed from the top surface (i.e., laser side) of the fabric. Image 704 illustrates the drilled through voids, as observed from the bottom surface (i.e., opposite side) of the fabric. The drilling criteria was to achieve through voids having a higher open area on the laser side or top surface relative to the opposite side or bottom surface of the fabric. Images 702 and 704 show the higher openings (FIG. 702) on the laser side or top surface relative to the openings on the bottom surface (FIG. 704). These through voids may also be drilled using a $CO_2$ laser that may be programmed or operated to generate optical pulses of a predefined pulse width over a predefined time period. Various other parameters associated with the through void drilling process may include, but are not limited to, setting the output power (Watts) of the laser, the drilling speed, the incremental movement in both x and y directions, the working distance (i.e., distance from laser head nozzle to surface of fabric), the density (holes/inch$^2$) requirements for a given fabric, and the number of passes for subjecting the fabric to optical radiation. As illustrated in FIG. 7, the shape of the through holes are substantially oval shaped in comparison to the through voids shown in FIG. 6. Different factors and/or parameters (e.g., drilling speed) may contribute to the differences in through void shape and through void open areas (%) corresponding to both the laser side and opposite side of the fabric.

FIGS. 8A-G illustrate images of a laminate fabric drilled in accordance with one aspect of the instant invention. The laminate fabric according to this embodiment may include two or more layers attached using a suitable laminating technique. A $CO_2$ laser, for example, may be operated in a tone burst mode, delivering an output power of around 600W, for example. Since the fabric being drilled was a laminate, the through voids were generated after multiple passes of the incident optical radiation.

FIGS. 8A-G are microscope images that show the depth of penetration of the incident optical radiation with each pass, from the $1^{st}$ pass to the $7^{th}$ pass. These images also show the raised edges created during the drilling process. Examples of these raised edges (i.e., top surface) are depicted at 804 (FIG.

Figure 8A:
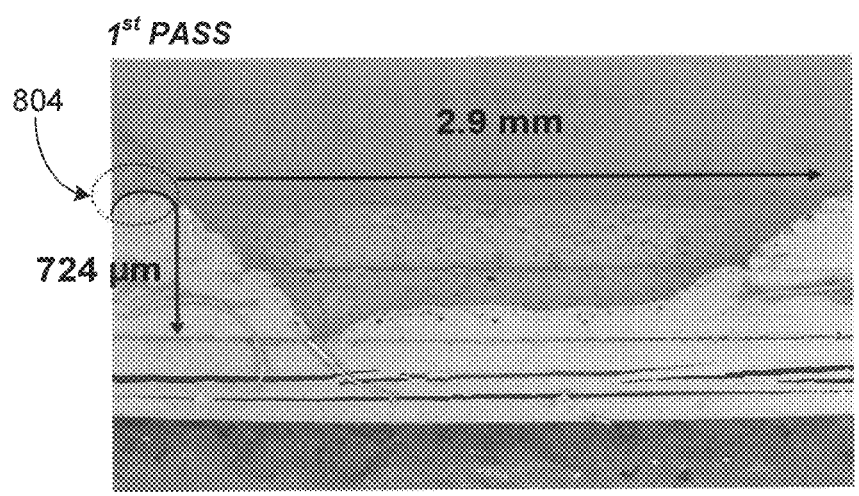
FIGS. 8A-G illustrate images of a laminate fabric drilled in accordance with an aspect of the instant invention.
Figure 8B:
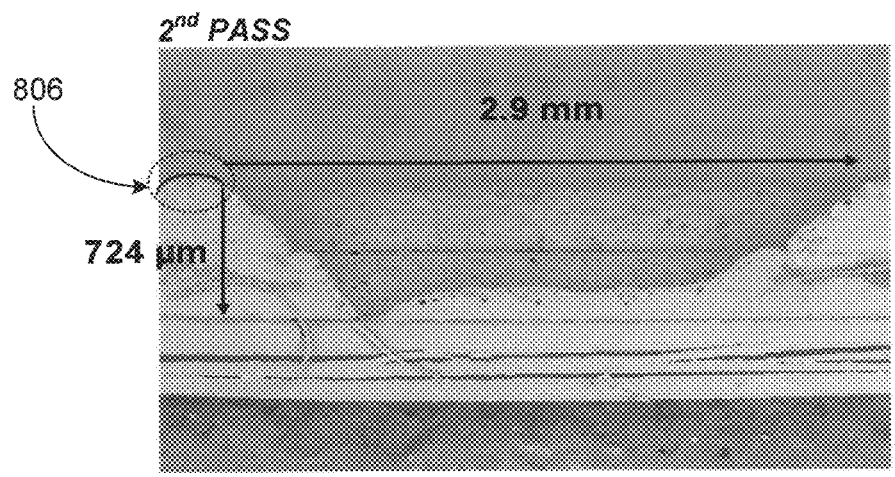
Figure 8C:
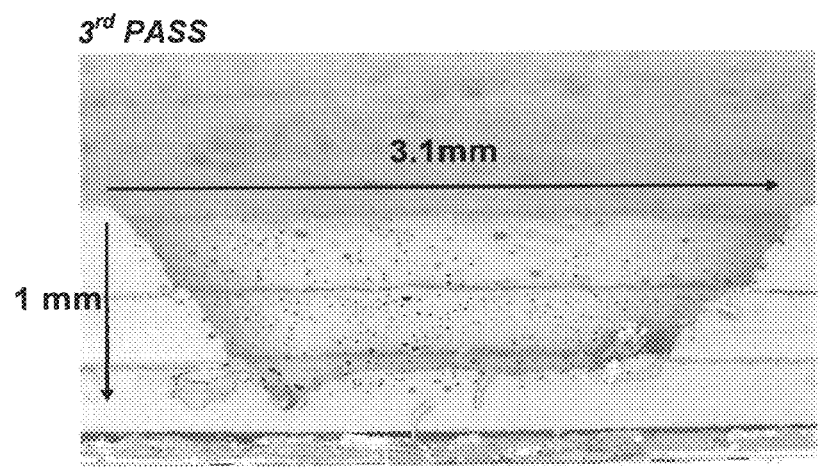
Figure 8D:
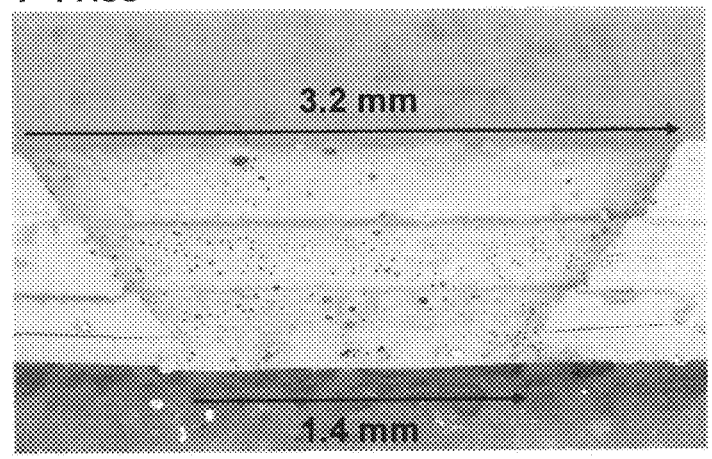
Figure 8E:
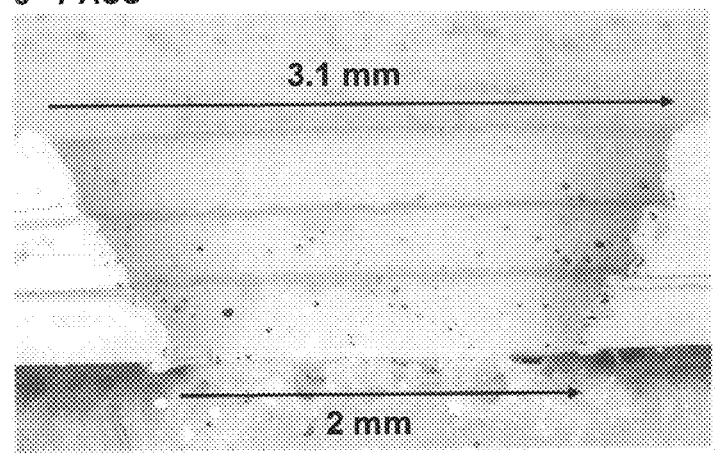
Figure 8F:
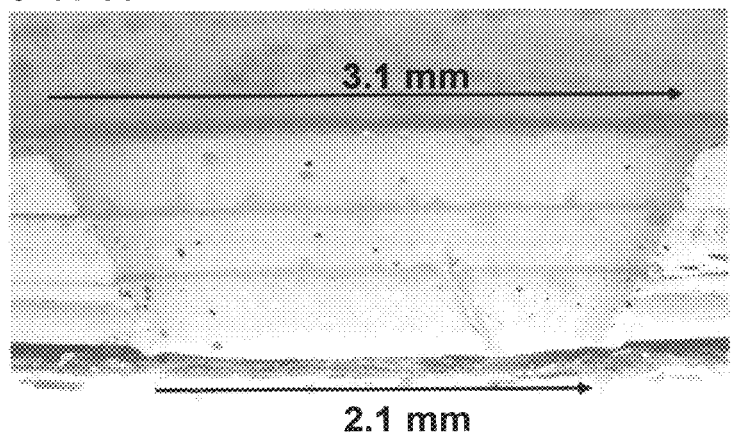
Figure 8G:
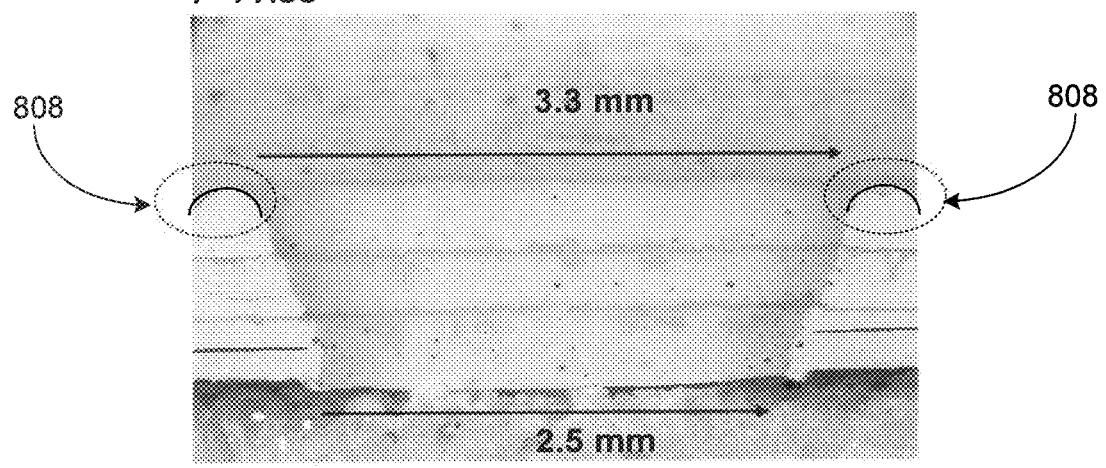

8A), 806 (FIG. 8B), and 808 (FIG. 8G). With each pass, the images in FIGS. 8A-G illustrate some increases in the openings on both the top surface and bottom surface of the through void. For example, the image associated with FIG. 8D shows a top surface opening having a diameter of about 3.2 mm on the top surface and a diameter of about 1.4 mm on the bottom surface of the through void after the $4^{th}$ pass. After the $7^{th}$ pass however, as illustrated in FIG. 8G, the top surface opening has increased to a diameter of about 3.3 mm on the top surface and a diameter of about 2.5 mm on the bottom surface of the through void. These depicted results show that 5 passes were needed to generate a through void. It will be appreciated, however, that the number of passes for generating a through void vary according to many factors such as, but not limited to, the laminate material, laminate thickness, laser device type, laser operating or drive parameters, etc.

Figure 9:
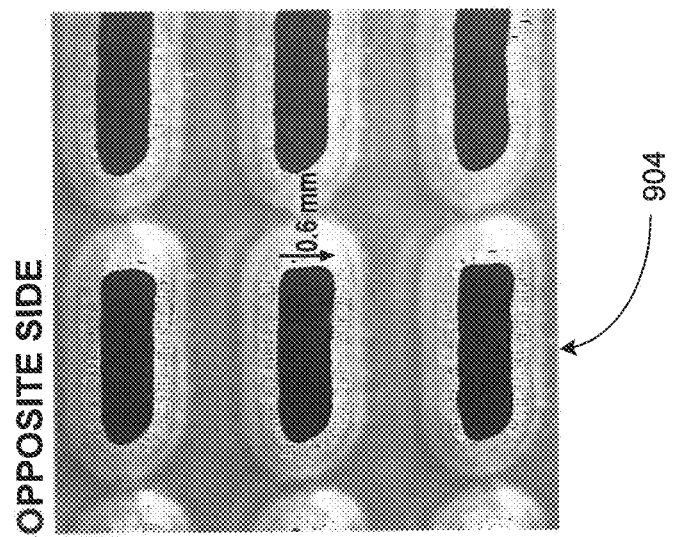
FIG. 9 illustrates images of both top and bottom surfaces of the drilled through voids corresponding to FIG. 8G.
Figure 9:
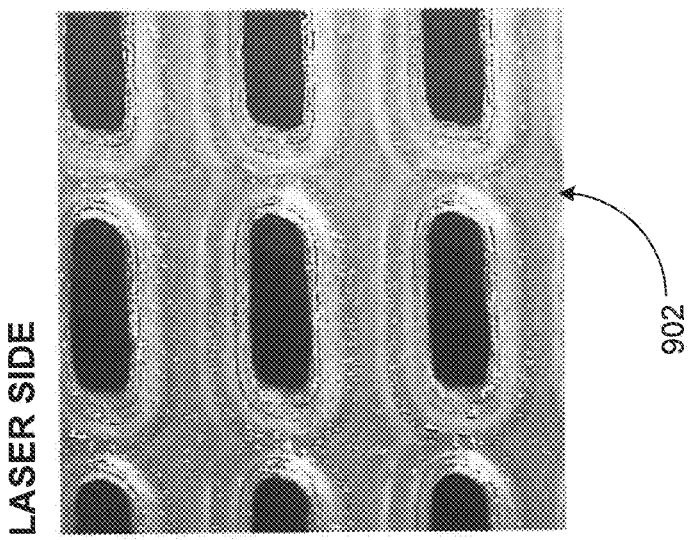

FIG. 9 illustrates the images of both the top surface 902 and bottom surface 904 of the drilled through voids corresponding to FIG. 8G (i.e., after $7^{th}$ pass). As shown in FIG. 9, after the $7^{th}$ pass the shape of the top and bottom openings of the through voids are substantially rectangular shaped.

Figure 10:
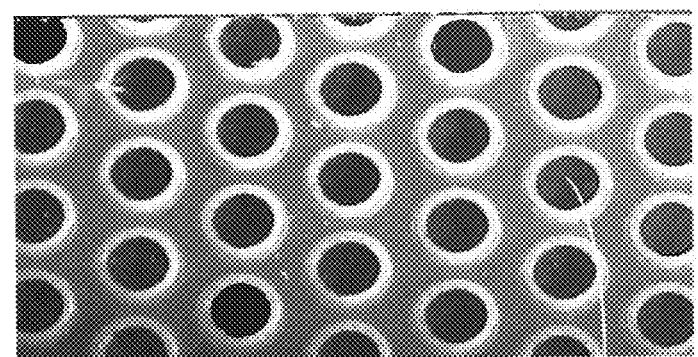
FIG. 10 depicts several generated through voids according to yet another aspect of the instant invention.
Figure 10:
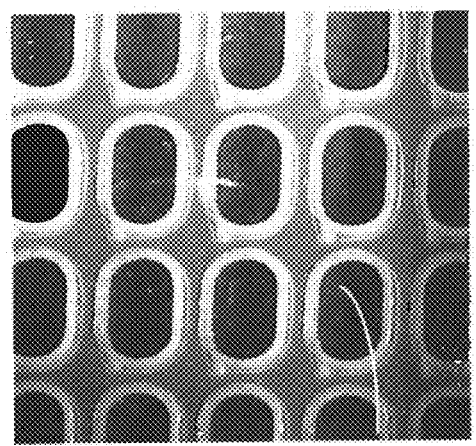

FIG. 10 depicts several void patterns from experimental trials for generating through voids according to yet another aspect of the instant invention. In some instances, through voids of an increased size may be desired. Laser spot size, for example, may be a limiting factor. To overcome this restriction and generate larger through voids, the laser device is effectively used as a cutter rather than a drill. To create this cutting action, the laser head may be wobbled (i.e., Wobulation or Vobulation) according to different frequency (e.g., Wobulation or Vobulation frequency) and strength criteria (e.g., Wobulation or Vobulation index) in order to establish larger through voids.

For example, images 1010 and 1012 depicted in FIG. 10 correspond to through voids that are generated based on different operating parameters such as, but not limited to, drilling speed, wobulation frequency, wobulation index, laser output power, etc. Accordingly, the shape of the surface openings 1014 for the through voids corresponding to image 1010 is substantially round, while the shape of the surface openings 1016 for the through voids associated with image 1012 is substantially rectangular. One factor, among others, affecting the shape of surface openings may be the scanning speed (i.e., mm/s) of the laser as the incident radiation moves from one position to the next in order to generate a subsequent through void in the fabric.

Figure 2B:
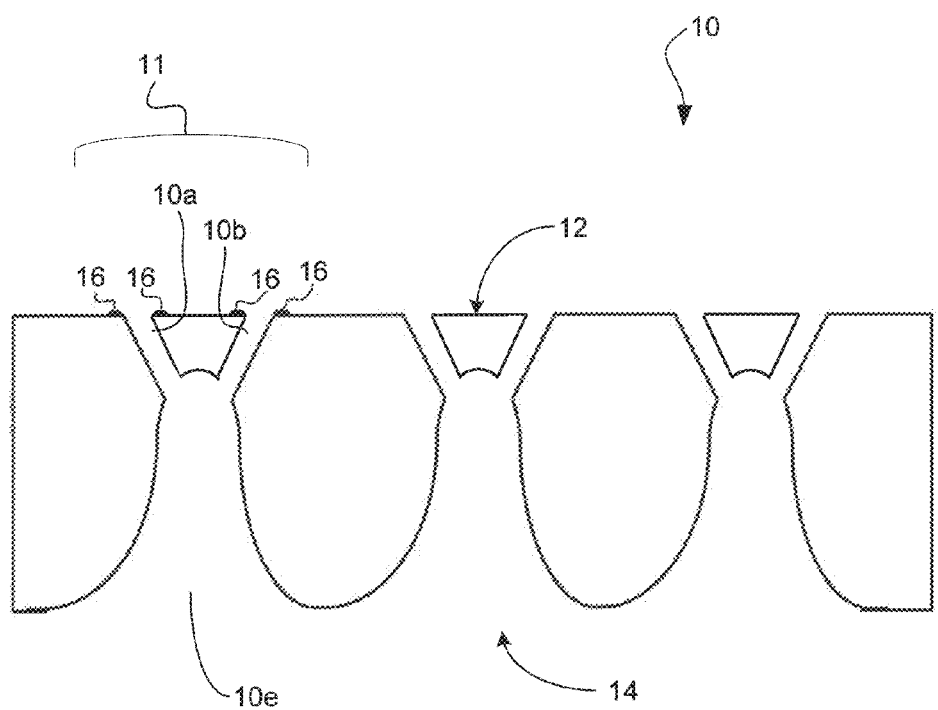
FIG. 2B is an example of a cross-section of a fabric having a branched void structure according to one aspect of the instant invention.

In another embodiment, a fabric structure that may or may not have a base support substrate comprises a sheet contact surface having a series of land areas and depressions, and a branched void structure adapted to impart texture to a tissue, towel, or nonwoven. FIG. 2B shows the cross-section of the surface of a fabric structure 10 with a branched void or opening 11 which comprises a plurality of small holes 10a and 10b on the sheet side 12 that are inclined such that they merge into a larger void 10c at an opposing side 14 of the surface. As illustrated, the branched opening 11 may also be formed to include raised edges or rims 16 adjacent the circumference of holes 10a and 10b. Although not shown in FIG. 2B, raised edges or rims may also be formed adjacent the circumference of the larger void 10c on the opposing side 14 of the fabric structure. Although holes 10n and 10h are shown as merging into void 10c, a branched void structure having three or more holes merging into a larger void may be contemplated, whereby raised rims may be formed adjacent either or both the smaller sheet side holes and the larger opposing side void. Further, the raised rims may cover the fabric either partially or fully.

Such a structure allows for a high number of small holes in a fabric structure while also allowing for low long term elongation in the machine direction MD while allowing for high bending stiffness in the cross machine direction CD. Such a structure can also be adapted such that, for example, it allows for holes in the fabric structure that are smaller in diameter than the substrate thickness without resulting in, for example, plugged holes due to contamination.

A fabric structure having the described branched structure surface is also contemplated for a TAD or other tissue or towel or nonwoven application. For example, a coarse structure on a paper side surface and smaller holes on an opposing machine side surface could, for instance, capture, shape, and/or orient fibers disposed on the fabric structure in a desired pattern and create a high bulk tissue, towel, or nonwoven. As previously described, the described voids can be straight (cylindrical) or conical. For instance, conical holes of different patterns could be designed such that they are larger and well distributed over one side such as a web or sheet side surface, whereas the voids on the opposing machine side surface could be substantially aligned along the MD, thereby providing, for example, increased drainage. The branched voids can be created by any number of perforation methods or combination thereof, including laser drilling, mechanical punching, and embossing (e.g. thermal or ultrasonic). For example, the voids could be created by combining laser drilling with embossing.

Bear in mind as aforementioned normally papermaking belts do not impart structure to the paper made thereon. "Structure" pertains to variations in the basis weight and/or the density of the paper which are greater than occur in ordinary papermaking and due to ordinary variations, such as those induced by creping. "Structure" may also, however, refer to a texture or a pattern in the tissue or towel sheet. Such "structured" tissue/towel sheets are usually soft and bulky with high absorbency. Such papermaking belts may be TAD belts or conventional press fabrics, transfer fabrics, or forming fabrics. Such belts comprise a surface patterning framework and may have a reinforcing structure. Structured tissue and towel can be softer, more absorbent, and be of a lower basis weight than unstructured tissue/towel.

A papermaker's fabric, generally, has two sides: a sheet contacting side and a machine or roll side. The former is so-called because it is the side of the fabric that faces the newly formed paper web. The latter is so-called because it is the side of the fabric that passes over and is in contact with the rolls on the papermaking machine.

As previously discussed, in the manufacturing process described in FIG. 4, after the web 44 is transferred to the backing roll 60, the web 44 is picked up on the creping fabric 18 running at a much slower rate of speed. After pickup, there is a vacuum box (not shown) to pull the web deeper into the voids of the creping fabric 18 and to remove additional residual water from the paper web by pulling the residual water into (and through) the interior of the creping fabric 18. Conventional logic would indicate that any residual water left in the creping fabric 18 after showering would rewet the web 44 after sheet pickup. In this embodiment, however, it does not appear to be the case with the creping fabric 18 installed on the papermaking machine such that wider openings are disposed on the sheet side and their corresponding smaller openings are disposed on the roll side. Moisture samples suggest that rewet is minimal if not totally eliminated. It has been observed that the fabric itself is running wet on the inside, which again is inconsistent with no rewetting. Consequently, no rewetting of the web 44, is an unexpected result. Thus, this unexpected result may be a function of the creping fabric 18 being installed on the papermaking machine with wider openings being disposed on the sheet side and their corresponding smaller openings being disposed on the roll side.

Figure 11:
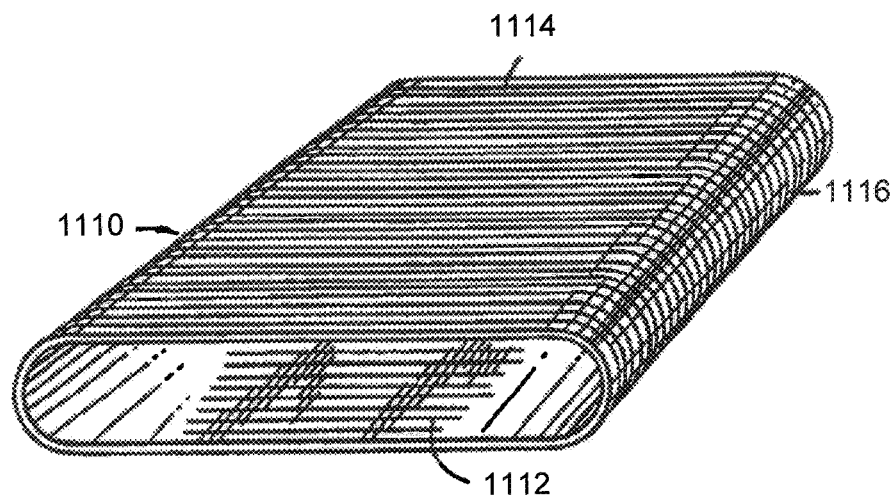
FIG. 11 is a perspective view of a fabric according to one aspect of the present invention.

FIG. 11 is a perspective view of a papermaker's belt 1110 formed according to one exemplary embodiment of the invention. According to this embodiment, the belt 1110 has an inner surface 1112 and an outer surface 1214, and is formed by spirally winding a strip of polymeric material 1116 produced using one of the several methods and systems discussed above. The belt may be produced using the method described in commonly owned U.S. Pat. No. 5,360,656 to Rexfelt et al., the entire contents of which are incorporated herein by reference. Material strip 1116 may be spirally wound in a plurality of abutting and mutually adjoined turns, substantially longitudinal direction around the length of the belt 1110 by virtue of the helical fashion in which the belt 1110 is constructed.

Figure 12:
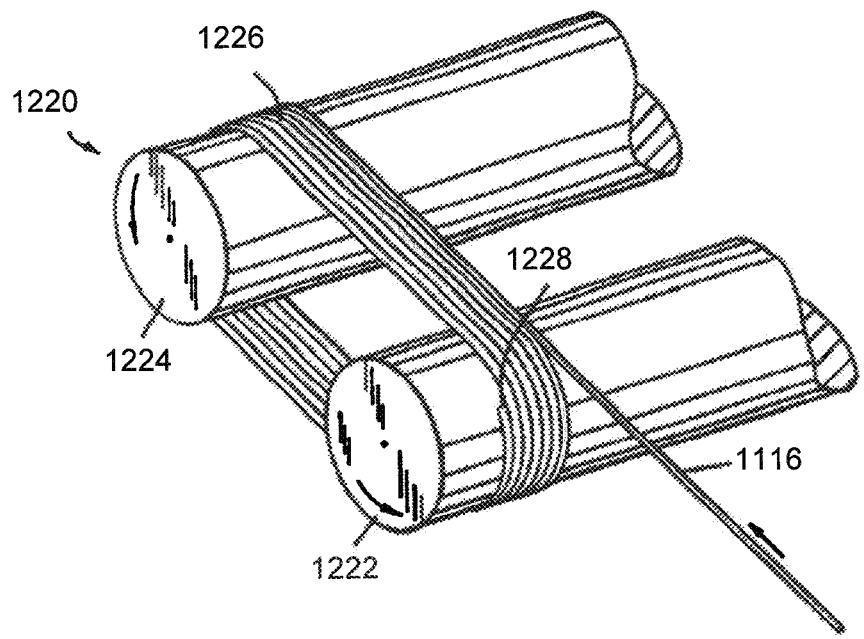
FIG. 12 illustrates a method by which the fabric of the present invention may be constructed.

An exemplary method by which the belt 1110 may be manufactured is illustrated in FIG. 12. Apparatus 1220 includes a first process roll 1222 and a second process roll 1224, each of which is rotatable around its longitudinal axis. The first process roll 1222 and the second process roll 1224 are parallel to one another, and are separated by a distance which determines the overall length of the belt 1110 to be manufactured thereon, as measured longitudinally therearound. At the side of the first process roll 1222, there is provided a supply reel (not shown in the figures) rotatably mounted about an axis and displaceable parallel to process rolls 1222 and 1224. The rolls 1222 and 1224 may be set so that the length of the fabric wound thereon is approximately the desired length of the final fabric. The supply reel accommodates a reeled supply of the material strip 1116 having a width of 10 mm or more, for example. The supply reel is initially positioned at the left-hand end of the first process roll 1222, for example, before being continuously displaced to the right or other side at a predetermined speed.

To begin the manufacture of the belt 1110, the beginning of the material strip 1116 is extended in taut condition from the first process roll 1222 toward the second process roll 1224, around the second process roll 1224, and back to the first process roll 1222 forming a first coil of a closed helix 1226. To close the first coil of the closed helix 1226, the beginning of the material strip 1116 is joined to the end of the first coil thereof at point 1228. As will be discussed below, adjacent turns of the spirally wound material strip 1116 are joined to one another by mechanical, thermal, and/or adhesive means.

Therefore, subsequent coils of closed helix 1226 are produced by rotating first process roll 1222 and second process roll 1224 in a common direction as indicated by the arrows in FIG. 12, while feeding the material strip 1116 onto the first process roll 1222. At the same time, the material strip 1116 being freshly wound onto the first process roll 1222 is continuously joined to that already on the first process roll 1222 and the second process roll 1224 by, for example, mechanical and/or adhesive or any other suitable means to produce additional coils of closed helix 1226.

This process continues until the closed helix 1226 has a desired width, as measured axially along the first process roll 1222 or the second process roll 1224. At that point, the material strip 1116 not yet wound onto the first process roll 1222 and the second process roll 1224 is cut, and the closed helix 1226 produced therefrom is preferably trimmed to make the edges of the fabric parallel and to a desired width to be used on the paper machine, and then removed from the first process roll 1222 and the second process roll 1224 to provide the belt 1110 of the present invention.

One method to seam or hold together the adjacent material strips, according to one embodiment of the invention, is to ultrasonically weld adjacent strips edge to edge while simultaneously providing a sideways pressure to keep the edges in contact with each other. For example, one part of the welding device can hold one strip, preferably the strip that has already been wound into a spiral, down against a supporting roll while another part of the device pushes the other strip, preferably the strip being unwound, up against the strip being held down.

The application of ultrasonic gap welding results in a particularly strong bond. By contrast, ultrasonic welding in either a time mode or energy mode, which is also known as conventional ultrasonic welding, results in a bond that can be described as brittle. Therefore, it may be concluded that a bond formed via ultrasonic gap welding is preferred versus conventional ultrasonic welding.

Another exemplary method to hold together adjacent strips, according to one embodiment of the invention, is to apply an adhesive to the ends of adjacent strips and joining them. It is to be noted that a filler material may be used to fill gaps or portions where the strips do not contact each other.

Another method to hold together adjacent material strips, according to one embodiment of the invention, is to weld the adjacent strips using a laser welding technique. One advantage of laser welding over ultrasonic welding is that laser welding can be accomplished at speeds in the range of 100 meters per minute while ultrasonic welding has a top end speed of about 10 meters per minute. The addition of a light absorptive dye or ink absorber to the edges of the strips may also assist in concentrating the thermal effect of the laser. Absorbers could be black ink or near IR dyes that are not visible to the human eye, such as for example those utilized by "Clearweld." The abutting edges of the strip may be prepared to improve the resistance to pulling apart in use. Edges may be skived at an angle or formed in other manners such as shown in co-owned U.S. Pat. No. 6,630,223 to Hansen, the disclosure of which is incorporated herein by reference.

The present methods and systems for producing belt 1110 are quite versatile and adaptable to the production of papermaker's and/or industrial fabrics or belts of a variety of longitudinal and transverse dimensions. That is to say, the manufacturer, by practicing the present invention, need no longer produce an endless woven or flat woven and seamed fabric of appropriate length and width for a given position on a paper machine. Rather, the manufacturer need only separate the first process roll 1222 and the second process roll 1224 by the appropriate distance, to determine the approximate length of the belt 1110, and wind the material strip 1116 onto the first process roll 1222 and the second process roll 1224 until the closed helix 1226 has reached the approximate desired width.

Further, because the belt 1110 is produced by spirally winding a material strip 1116, and is not a woven fabric, the outer surface 1112 of the belt 1110 is smooth and continuous, and lacks the knuckles which prevent the surfaces of a woven fabric from being perfectly smooth. Preferably, the material strip may be a strip of thermoplastic material, such as a film or foil, for example, and may be made of any polymeric material, preferably Polyester (PET). However, other materials such as other polyesters (e.g., polyethylene naphthalate (PEN)) or polyphenylene sulphide (PPS) could also be used. Polyamides, or polyether ether ketones (PEEK) may also be used. With respect to a laminate of two or more layers, each layer can be the same or formed of different materials. The film or foil can be uniaxially or biaxially oriented with sufficient modulus and stability in both MD and CD to function in the intended manner. In addition, the film or foil may contain reinforcing fibers in the MD or CD, or both MD and CD, or in any random direction. The reinforcing fibers may be included through an extrusion or pultrusion process where the fibers may be extruded or pultruded along with the material forming the film or foil. Reinforcing fibers may be formed of a high-modulus material, such as for example, aramids, including but not limited to Kevlar® and Nomex®, and may provide extra strength, modulus, tear and/or crack resistance to the film or foil.

Alternatively, the material strip may be a strip of nonwoven material formed of a low melt fiber, such as polyamides, for example, which may be carded and consolidated by needle punching or other suitable means, and which may be fused by passing the material strip through a heated roll nip, for example, thereby creating a smooth surface on one or both sides of the material strip. The nonwoven material may also comprise a blend of different materials, such as for example, a combination of low melt and high melt fibers, e.g. 90% of a low melt polyamide 6 in combination with 10% PA6,6, or any other combination chosen to impart a desired characteristic. Alternatively, a portion of the nonwoven material may comprise bicomponent fibers, such as for example sheath-core type fibers, which may have the low melt material on the outside and the functional material on the inside. The material strip can also be coated, for example, using a polyurethane resin to provide additional, for example, fabric smoothness. The coating can enhance sheet release, and/or structural integrity of the material strip. The aforesaid structures may then be perforated in a manner as heretofore described.

The inventive fabric may include one or more additional layers on top of or under the substrate formed using the material strips, merely to provide functionality, and not reinforcement. For example, the additional layers used may be any of woven or nonwoven materials, MD and/or CD yarn arrays, spirally wound strips of woven material that have a width less than the width of the fabric, fibrous webs, films, or a combination thereof, and may be attached to the substrate using any suitable technique known to one of ordinary skill in the art. Lamination by thermal bonding and chemical bonding are but a few examples.

The use of a fabric as described herein may result in a tissue or towel sheet with high caliper and low density, an unexpected result. The high caliper and low density results in a softer tissue or towel product having an increased absorbency, both of which are very desired characteristics.

Lastly, the instant fabric may allow the papermaking process to be run at a wider array of percent of fabric crepe, basis weight and/or increased recycled fiber content and may produce significant value by increasing the range of operating process parameters.

Although a preferred embodiment of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. A method of generating through voids in a papermaking fabric, said method comprising:
   producing a first opening associated with a top surface of said fabric;
   producing a second opening associated with a bottom surface of said fabric;
   and producing at least one raised edge circumferentially adjacent to at least one of said first and second opening, wherein said raised edge forms a continuous raised rim around said opening.

2. A method of generating through voids in a papermaking fabric, comprising:
   generating incident optical radiation for impacting said fabric; and
   controlling at least one characteristic associated with said incident optical radiation such that said incident optical radiation generates through voids that each include at least one raised edge circumferentially adjacent to an opening created on at least one of top and bottom surfaces associated with said fabric.

3. The method as claimed in claim 2, wherein each of said through voids includes an inner surface area of a substantially conical or cylindrical shape.

4. The method as claimed in claim 2, wherein said controlling of at least one characteristic associated with said incident optical radiation comprises generating through voids that each include a top surface opening that has a larger surface area than a bottom surface opening.

\* \* \* \* \*